United States Patent [19]
Walsh

[11] 3,729,260
[45] Apr. 24, 1973

[54] INTERFEROMETRIC ROTATION SENSOR

[75] Inventor: Thomas M. Walsh, Cupertino, Calif.

[73] Assignee: The United States of America as represented by the Administrator of the National Aeronautics and Space Administration

[22] Filed: June 21, 1971

[21] Appl. No.: 154,933

[52] U.S. Cl. .................................................. 356/110
[51] Int. Cl. .................................................. G01b 9/02
[58] Field of Search ....................................... 356/106–113

[56] References Cited

UNITED STATES PATENTS 3,556,660  1/1971  Mottier ........................... 356/106
3,527,537  9/1970  Holrrough ....................... 356/110

OTHER PUBLICATIONS

"Modification of Michelson Inteferometer Using only One Corner Cube", 50 JOSA83

Primary Examiner—Ronald L. Wibert
Assistant Examiner—Conrad Clark
Attorney—Darrell G. Brekke et al.

[57] ABSTRACT

An interferometric rotation sensor and control system is provided which includes a compound prism interferometer and an associated direction control system. Light entering the interferometer is split into two paths with the light in the respective paths being reflected an unequal number of times and then being recombined at an exit aperture in phase differing relationship. Incoming light deviating from the optical axis of the device by an angle $\alpha$ causes a similar displacement of the two component images at the exit aperture with the result being that a fringe pattern is developed with the number of fringes being directly related to the angle $\alpha$. Various control systems incorporating the interferometer are also disclosed.

4 Claims, 11 Drawing Figures

Patented April 24, 1973
3,729,260
4 Sheets-Sheet 1
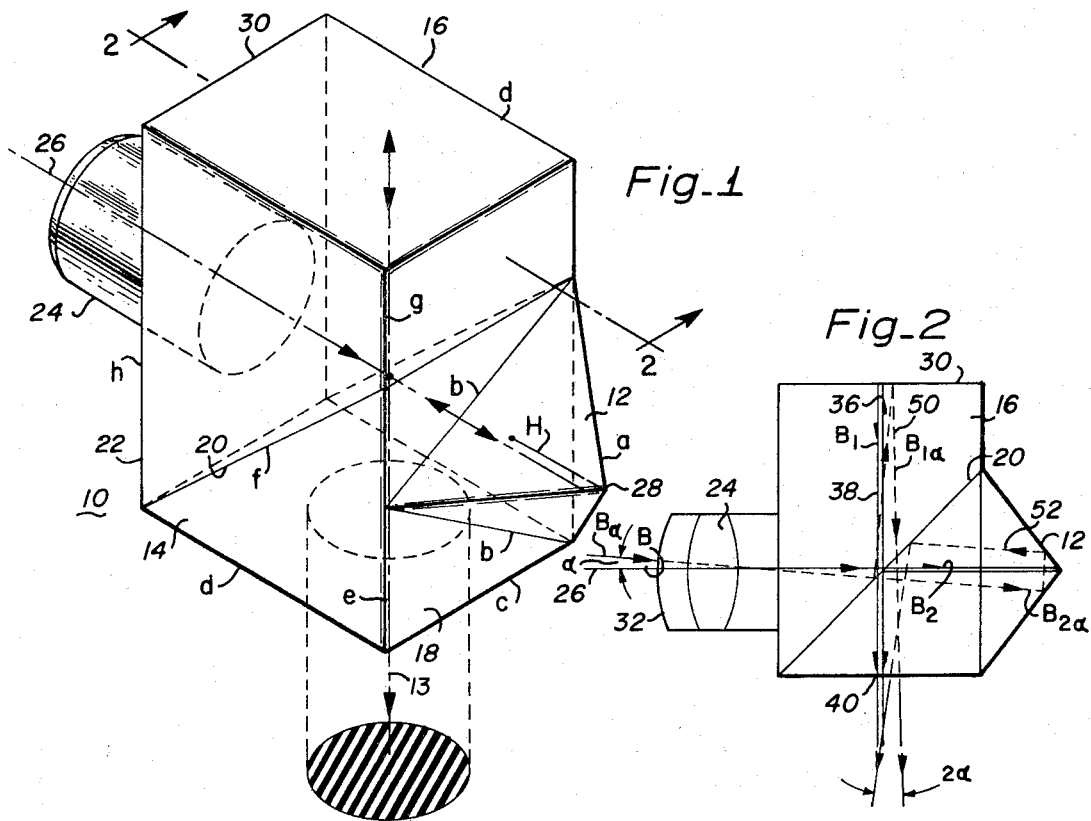
Fig_1
Fig_2
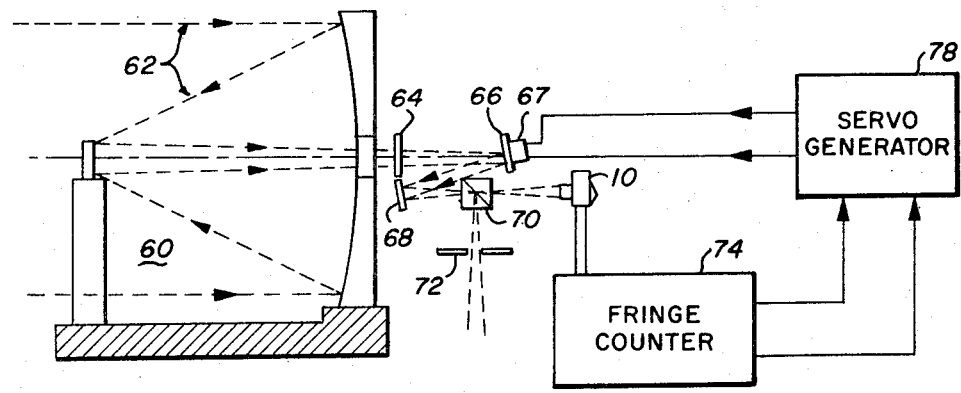
Fig_3
INVENTOR.
THOMAS M. WALSH
BY
Daniel G. Buhler
ATTORNEY

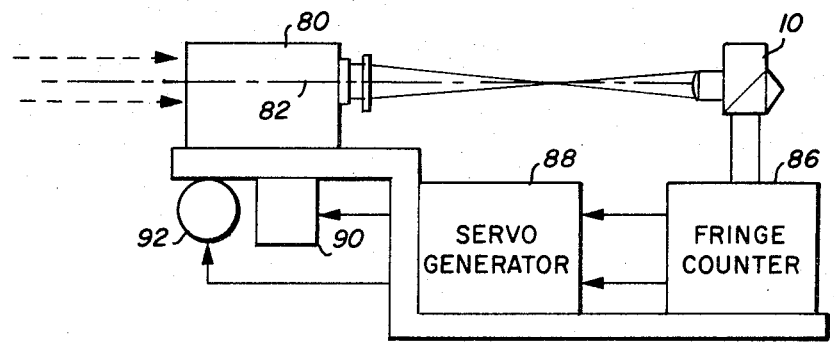
Fig_4
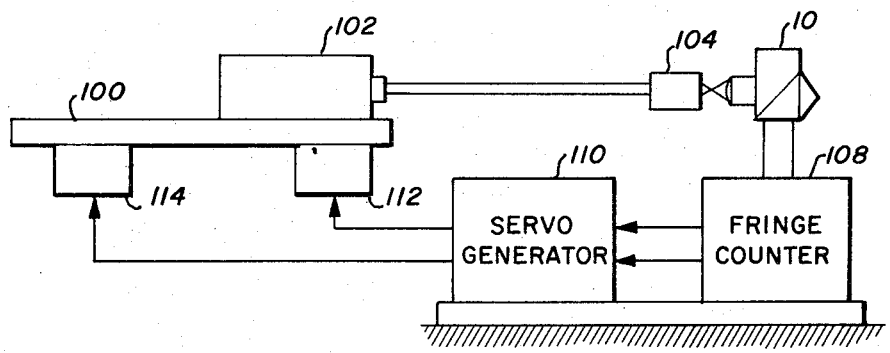
Fig_5
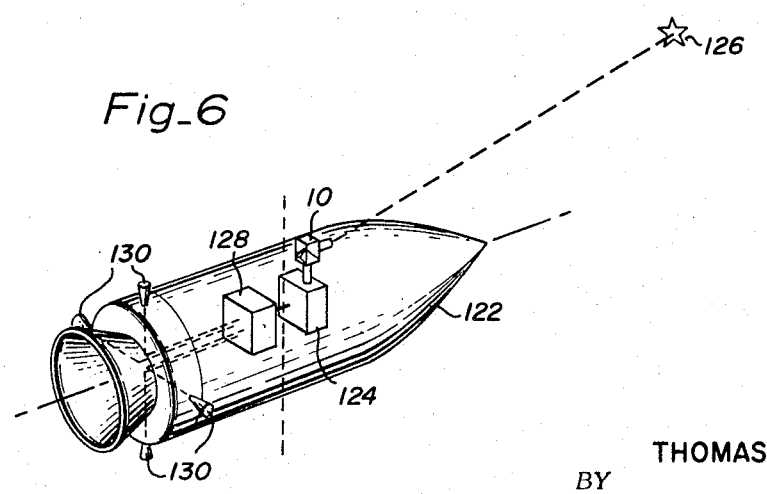
Fig_6
INVENTOR.
THOMAS M. WALSH
BY
ATTORNEY

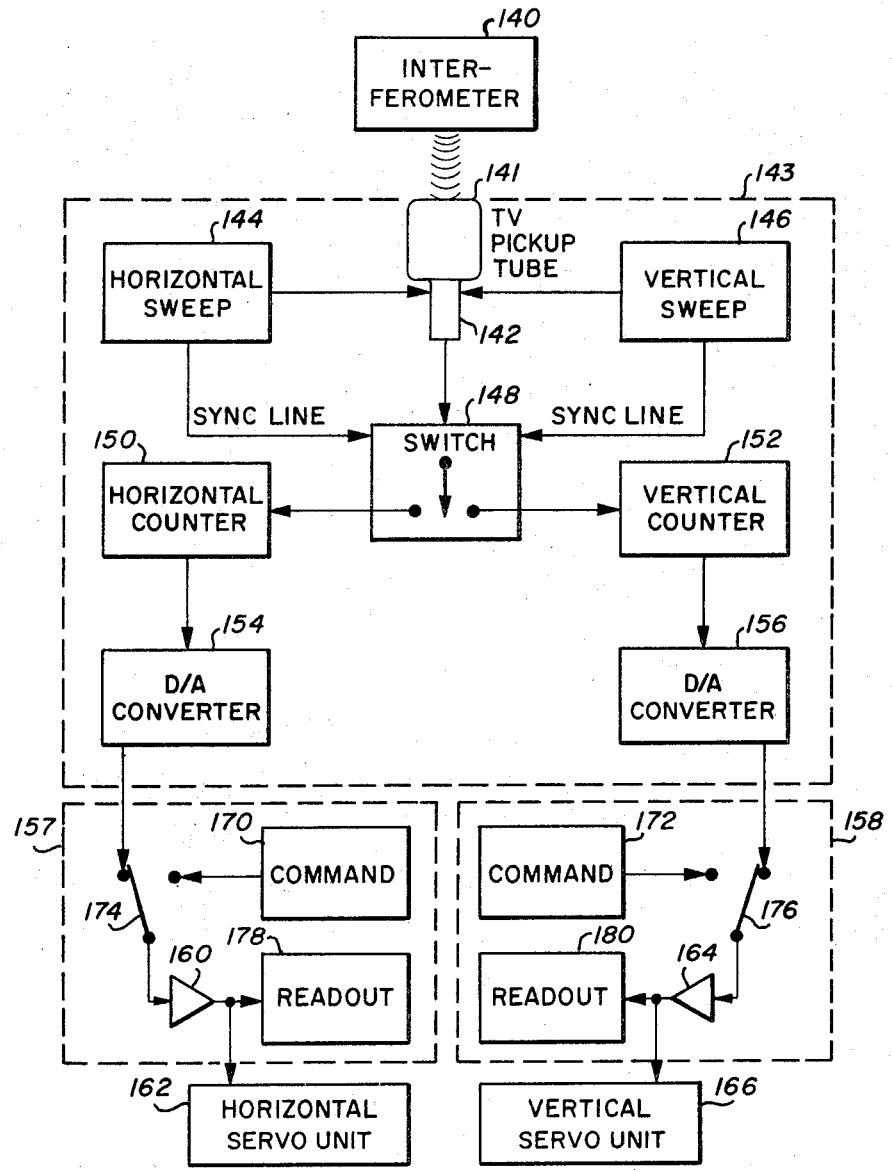
Fig_7
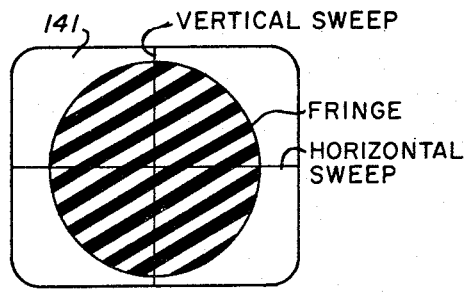
Fig_8

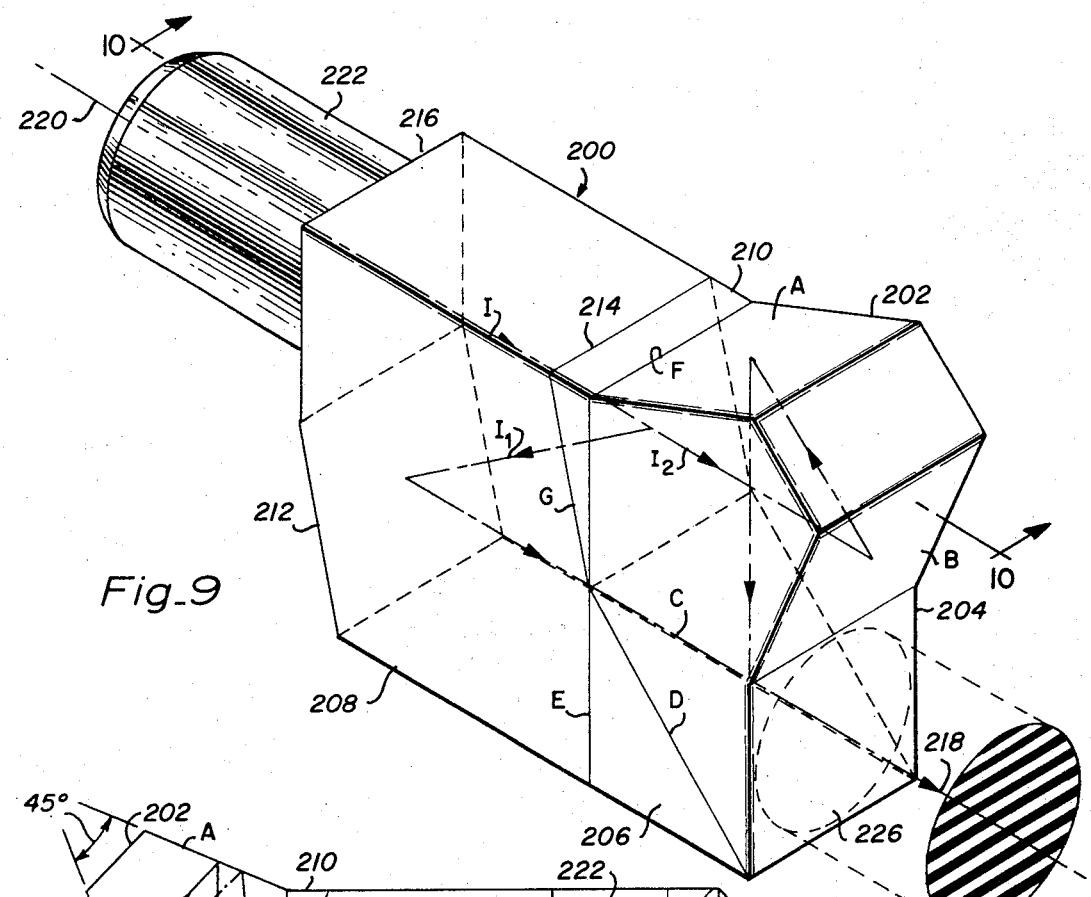
Fig_9
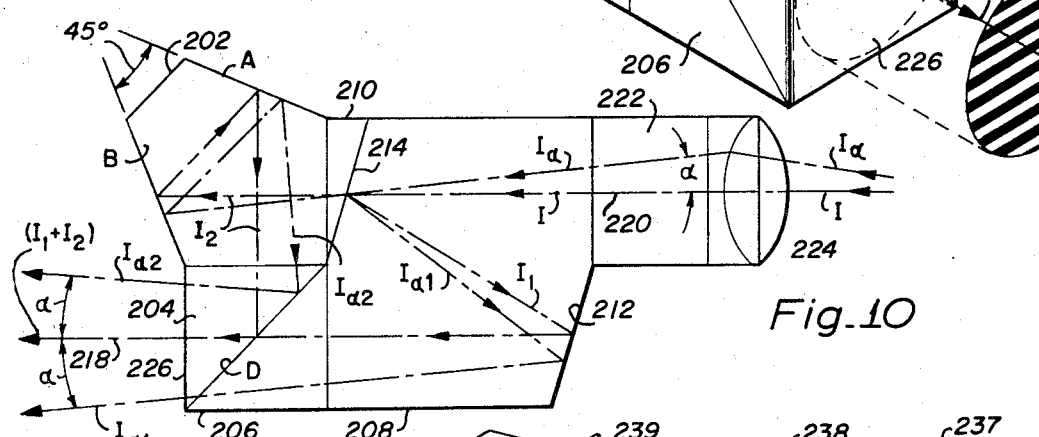
Fig_10
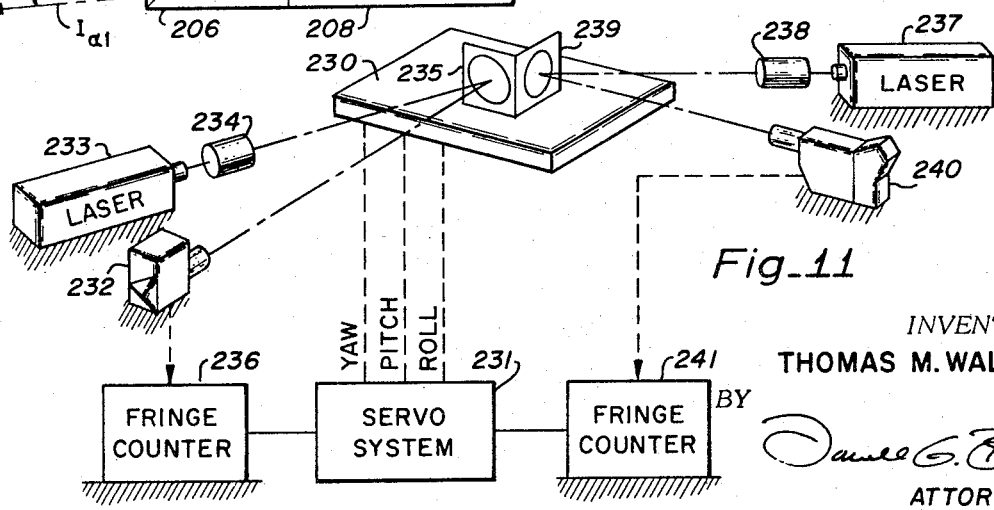
Fig_11
INVENTOR.
THOMAS M. WALSH
BY
ATTORNEY

INTERFEROMETRIC ROTATION SENSOR

The invention described herein was made by an employee of the United States Government and may be manufactured and used by or for the Government for governmental purposes without the payment of any royalties thereon and therefor.

BACKGROUND OF THE INVENTION

1. Field of the Invention

The present invention relates generally to direction and rotation sensing apparatus and, more particularly, to a novel interferometric prism and associated control systems for precisely determining the direction to a remote light source.

2. Description of the Prior Art

One method of accurately determining direction to a distant point is to utilize some type of light-seeking device to determine the angular deflection between an instrument reference and a remote source of natural light, a star or reflecting planetary body, or artificial light. Such devices have great utility in applications wherein extreme precision of orientation is required, for example, as in the case of spacecraft attitude orienting systems, precision machine tooling apparatus, and precision alignment systems.

In one prior art device, light from a distant source is focused to a spot on the face of an image dissector tube and rotation of the collecting optics relative to the line of sight to the source causes the spot to translate over the face of the tube. The spot is detected by electronically scanning the tube face, and scan logic is used to determine the position of the spot relative to a null or reference position. An error signal proportional to the relative spot position can then be used to drive a control system for keeping the optics pointed along the line of sight to the light source.

In accordance with another prior art system, light from a distant source is focused to a spot on the apex of a four-sided pyramid such that the light is split into four quadrants with the light in each quadrant being measured by a photomultiplier tube. The sums and differences of the signals generated by the respective tubes are then used as error signals to drive the optical axis back to a null position.

These systems, however, are subject to the disadvantages that translational motion of the sensors, induced by either external or internal vibrations, gives rise to an error signal dead ban zone around the null, or line of sight position (the dead ban zone limits the precision of pointing along the line of sight to the extent of the translation); translational motion of the sensor due to thermal expansion or contraction results in an induced sensor that is sensed as a rotation; translational motion of the sensor due to creep or mechanical stress distortions of components results in a zero shift or null shift that will be sensed as a rotation; and voltage and temperature changes within the electronics of the system result in zero or null shift resulting in a sense rotation error.

SUMMARY OF THE PRESENT INVENTION

It is therefore an object of the present invention to provide a novel direction sensing and control apparatus which is not subject to the aforementioned disadvantages of the prior art.

In accordance with the present invention, an interferometric rotation sensor and control system is provided which includes a compound prism interferometer and an associated direction control system. The interferometer is designed so as to split a beam of light entering the prism through an entrance aperture into two component beams which are directed over different internal paths and then recombined to develop at an exit aperture a fringe pattern which is directly related to the deviation of the optical entrance axis from the line of sight to the light source. The interferometer interference fringes, the number of which are directly related to rotation in pitch and/or yaw of the line of sight to a collimated point source of visible, infrared, or ultraviolet radiation, i.e., the number of fringes generated by the device is a direct measure of a total angular deviation of the optical axis from the line of sight to the light source.

One embodiment of the present invention includes an interferometer having directional sensitivity in a single direction, while an alternate embodiment is sensitive in two directions. The interferometer embodiments form part of several control systems which determine precisely the deviation from the source line of sight and may include a feedback system for maintaining the sensor orientation accurately aligned with the source line of sight.

An advantage of the present invention is that it eliminates errors due to translations of the sensor relative to the line of sight; for example, those due to vibration, thermal expansion or contraction of components, and creep due to mechanical stress distortions of components.

Another advantage of the present invention is that it eliminates errors from zero or null shift due to lack of stability of electronic circuitry from such causes as voltage variation temperature changes, etc., since the fringe counting operation is not ad dependent on these parameters as in the prior art.

Other advantages of the present invention will no doubt become apparent to those skilled in the art after having read the following detailed description of the preferred embodiments which are illustrated in the several figures of the drawings.

IN THE DRAWINGS

FIG. 1 is a perspective diagram of a compound prism interferometer in accordance with the present invention.

FIG. 2 is a section taken through the prism of FIG. 1 along the lines 2—2.

FIG. 3 illustrates a telescope stabilization and fine pointing control system in accordance with the present invention and utilizing the prism shown in FIG. 1.

FIG. 4 illustrates a simplified star tracking system in accordance with the present invention and utilizing the prism shown in FIG. 1.

FIG. 5 is a system utilizing the prism illustrated in FIG. 1 for monitoring the fine rotation of a tool stage.

FIG. 6 illustrates the use of the present invention as a space vehicle guidance control means.

FIG. 7 is a block diagram showing a two-axis control system in accordance with the present invention.

FIG. 8 illustrates an exemplary fringe pattern as viewed by the television pickup tubes shown in FIG. 7.

FIG. 9 is a perspective view of a compound prism interferometer having single axis sensitivity.

FIG. 10 is a cross section taken along the line 10—10 of the interferometer illustrated in FIG. 9.

FIG. 11 illustrates an exemplary use of a prism interferometer in accordance with the present invention.

DETAILED DESCRIPTION OF THE PREFERRED EMBODIMENTS

Referring now to FIGS. 1 and 2 of the drawings, a compound prism interferometer 10 in accordance with the present invention and having dual axis sensitivity is illustrated. Interferometer 10 includes a trihedral prism 12, a beam splitting prism 14, and a mirror prism 16. The dimensions of edges $a$ and $b$, and altitude H of corner prism 12 are as indicated in Table I where L is edge length of the corner. Beam splitter prism 14 is a 45° right triangular prism having edge dimensions $c, d, e$ and $f$ as indicated in Table I, and the edge dimensions $c, d, f, g$ and L of prism 16 are also indicated in Table I.

TABLE I

| | |
|---|---|
| a | L |
| b | $\sqrt{2}L$ |
| c | $\sqrt{3/2}L$ |
| d | $\sqrt{2}L$ |
| e | $\sqrt{2}L$ |
| f | $2L$ |
| g | $L/\sqrt{3}$ |
| h | $(\sqrt{2}+1/\sqrt{3})L$ |
| H | $L/\sqrt{3}$ |

The base of corner prism 12 is cemented to face 18 of beam splitter prism 14, and the beam splitting face 20 of prism 14 is cemented to the matching face of prism 16 so as to form the compound prism constituting interferometer 10. For visible spectrum use the prism material is typically optical glass, whereas for ultraviolet or infrared spectrum use, the prism material us usually calcium fluoride, or other material exhibiting good transmission in those wavelengths.

Affixed to prism face 22 is a lens system 24 which is appropriately designed to collimate incident light from a distant source as focused by the collector optics of a system including interferometer 10. Lens system 24 is positioned so that its optical axis 26 passes through the apex 28 of corner prism 12. The exterior surfaces of prism 12 and face 30 of prism 16 are coated with a highly reflective coating so as to provide total internal reflection at those surfaces.

As illustrated in FIG. 2, a beam of diverging light rays B entering entrance pupil 32 from the focal point of lens system 24 on axis 26 will be collimated thereby, and pass through prism 16 to intersect the beam splitting surface 20. Upon striking surface 20, light rays are split into component beams illustrated by the rays $B_1$ and $B_2$ with rays $B_1$ being reflected upwardly along path 36 to strike surface 30 and being returned back toward surface 20 along the path 38. Upon again striking surface 20, a portion of the rays $B_1$ is reflected and lost but the remainder is transmitted to the exit pupil 40. On the other hand, the rays $B_2$ of the component beam which was transmitted through surface 20 pass into corner prism 12 which serves as a retroreflector for reflecting the rays $B_2$ back onto the underside of surface 20. As in the case of rays $B_1$, a portion of the light rays $B_2$ is transmitted through surface 20 while the remainder is reflected downwardly through exit pupil 40 to be recombined with beam $B_1$. It will be noted that rays $B_1$ and $B_2$ will be in phase since the rays $B_1$ are subjected to two inversions (at surfaces 20 and 30) before reaching exit pupil 40, while the rays $B_2$ are subjected to four inversions (three surfaces of prism 12 and surface 20) before arriving at exit pupil 40. Accordingly, no fringe pattern will be developed at exit pupil 40. A light beam entering pupil 32 at an angle relative to axis 26 as indicated by the rays $B\alpha$ will likewise be collimated and then be split by surface 20 into component beams indicated by the rays $B_{1\alpha}$ and $B_{2\alpha}$, with the rays $B_{1\alpha}$ being reflected upwardly by surface 20 along path 50, and then back down by surface 30 and through surface 20 to exit pupil 40. The rays $B_{2\alpha}$ are reflected by retroreflecting prism 12 back to the underside of surface 20 along path 52 where they are in turn reflected out exit pupil 40. Note that rays $B_{1\alpha}$ and $B_{2\alpha}$ are in phase with each other upon reaching exit pupil 40, but they are laterally misaligned by the angle $2\alpha$. It can thus be shown that the number N of fringes in the light passing out of exit pupil 40 can be expressed as $$N = 2\alpha n_s A/\lambda$$

where $\alpha$ is the angular deviation of the incoming light from the optical axis 26,
$n_s$ is the index of refraction of the prism material,
$A$ is the aperture of the collector system, and
$\lambda$ is the wavelength of light entering the system.

By way of example, if interferometer 10 is utilized in a star tracker wherein the aperture $A$ is 1 inch, $n_s$ is 1.765 (sapphire), $\lambda$ is $5461 \times 10^{10}$ meters, and $\alpha$ is 1.26 seconds of arc, one fringe will appear at exit pupil 40. If on the other hand, $\alpha$ equals 12.6 seconds of arc, then 10 fringes will be viewed at exit pupil 40. It can thus be seen that a simple count of the fringes at exit pupil 40 will provide a direct indication of the magnitude of deviation angle $\alpha$. If a plane were perpendicular to optical axis 26 and located in front of lens system 24 and that plane contained an X-Y coordinate system with its pole at axis 26, a light source directly above axis 26 (sighting from rear to front of interferometer 10) would have a polar angle of 90°, a light source directly to the left of axis 26 would have a polar angle of 180°, etc. The angular disposition of the parallel fringe lines about exit axis 13 is varied degree for degree (one-to-one ratio) as the polar angle of the light source is varied; and an orthogonal relationship exists between the polar angle and the fringe lines. Thus, the polar angle of the light source can be determined from the angular disposition of the fringe lines and the interferometer has two-axis sensitivity. Since the fringe lines have no sense, they are not vectors and there is an ambiguity of 180°. This can be easily resolved a number of ways. For example, interferometer 10 can be purposely calibrated so that a predetermined number of fringes (a bias) will be generated for a "zero-error+ or "on-axis" condition. Then the direction the interferometer is moving can be determined by noting whether the count goes down or up. [If, for example, the fringe counting system had a resolution of 500 lines, the zero could be set at a bias of 250 lines by first pointing axis 26 at the light source, rotating the interferometer 45° and then deviating the axis of the sensor in the 45° plane until 250 fringe lines were generated. This would then be the calibrated zero. Deviations from the zero would result in counts up or down from 250 with the direction of the sighting error determined by the magnitude of the fringe count relative to 250. For light entering the interferometer in planes other than the 45° plane, the fringes would vary in count in X and Y scan in proportion to the sine and cosine of the angle of the incidence plane.] Alternatively, to resolve the 180° ambiguity, accelerometers, voltage-energized potentiometers, or other motion detectors could be mechanically coupled to the interferometer to directly measure the direction of motion of the interferometer.

Turning now to FIG. 3 of the drawings, an implementation of the interferometer 10 is shown as used in a stabilization and fine pointing control system for a large aperture telescope (such as a star tracker). This system includes, in addition to the interferometer 10, a large aperture telescope 60 which focuses incoming light rays 62 through filters 64, which limit the incoming light to a particular range of wavelengths, and onto an angularly displaceable mirror 66 which is servo driven by a precision electromechanical instrument 67, such as the piezoelectric optical mount Model 870 manufactured by Coherent Optics, Inc., of Fairport, N.Y. Mirror 66 reflects the light rays 62 onto a fixed mirror 68 which in turn reflects the light into a beam splitter 70. Beam splitter 70 reflects a part of the incoming light into the telescope focal plane 72 and transmits a part of the light into the entrance pupil of interferometer 10. The output of interferometer 10 is projected into fringe counter 74 which counts the number of fringes developed at the exit pupil of interferometer 10 and generates a responsive electrical signal for input into servo generator 78 which in turn develops signals for driving mirror servo unit 67.

In operation the telescope is roughly positioned by a course alignment servomotor (not shown) until the image of a distant light source, such as a star, is projected into the input pupil of interferometer 10. At that point the course alignment servo is disabled and the mechanism of the present invention is used to provide precision alignment of the image onto focal plane 72 in response to the fringe count output of interferometer 10. In addition, the output of servo generator 78 can be adapted for use in providing vernier drive for the telescope positioning mechanism so as to cause the telescope 60 to accurately "track" the light source. Although not specifically illustrated the entire fine pointing control system is preferably mounted to rotate with telescope 60.

In FIG. 4 of the drawings, a star tracking system in accordance with the present invention is illustrated wherein the star tracker 80 and interferometer 10 are mounted together to share a common optical axis 82 so that when the star tracker is pointed directly at a distant star, the image of the star will be projected into the entrance pupil of interferometer 10 and directly along its optical axes. However, when the line of sight to the star is not coincident with optical axis 82, the imaging light entering the entrance pupil of interferometer 10 will be likewise displaced, and accordingly, as described above, a fringe pattern will be developed at the exit pupil of interferometer 10, with the number of fringes and orientation of the pattern being directly proportional to the angular deviation. As in the previous embodiment, a fringe counter 86 is provided for counting the fringes and developing a responsive output signal for application to servo generator 88. Generator 88 then develops a pair of control signals for driving the servomotor 90 and 92 to maintain the optical axis 32 coincident with the line of sight to the star being tracked.

Referring now to FIG. 5 of the drawings, still another embodiment of the present invention used to monitor the fine rotation of a tool stage 100 is disclosed. In this embodiment a laser 102, or other suitable source of light, is mounted to tool stage 100 so as to direct a light beam towards the lens system 104 which is associated with the input optics of an interferometer 10. With interferometer 10 fixed in position (or movable over some predetermined path), its fringe count output can, by way of fringe counter 108 and servo system 110, be used to provide precision control of tool stage 100. It should also be noted that instead of mounting laser 102 directly to tool stage 100, it could be remotely disposed and focused onto a mirror carried by tool stage 100 for reflecting the beam into lens 104. As in the previous embodiments the output of interferometer 10 is directed into the entrance aperture of a fringe counter 108 that, in response to the number of fringes developed, provides control signals for input to servo generator 110 which in turn generates signals for driving servomotor 112 and 114. The advantages of this system will be immediately apparent for use in applications wherein precision control of a tooling mechanism is required.

In FIG. 6, still another application of the present invention is illustrated. In this system the interferometer 10 and associated control system are used to maintain precision orientation of a spacecraft 122 relative to a distinct heavenly body, such as the start 126, which serves as a light source. Once interferometer 10 is roughly aligned so that source 126 is in its view field, a fringe pattern will be developed and analyzed by fringe counter 124. A servo system 128 is responsive to the output of counter 124 and controls the directional jets 130 for locking spacecraft 122 onto a given course with great precision.

Turning now to FIGS. 7 and 8 of the drawings, a preferred embodiment of a fringe counter and servo system in accordance with the present invention is shown in block diagram form. The optical output of a passive interferometer 140 (such as that described above) is imaged onto the face 141 of a television pickup tube 142 (image dissector tube, vidicon, iconoscope, etc.) of fringe counter 143 so as to develop a fringe pattern thereon such as is illustrated in FIG. 8. The sweep circuits of horizontal and vertical sweep generators 144 and 146 are designed so that they will trace a simple + shaped path over the tube face 141. The output of TV pickup tube 142 and the sync lines of sweep generators 144 and 146 are fed into a switch 148 which automatically switches the TV pickup tube output alternately between a horizontal trace counter 150 and a vertical trace counter 152. The sync lines insure synchronous switching of switch 148 so that the respective counters count only during the appropriate sweep cycle. The digital count in counter 150 (number of fringes along the horizontal axis) is a function of the horizontal error, while the digital count in counter 152

(number of fringes along the vertical axis) is a function of the vertical error. The digital output signals generated by counters 150 and 152 are converted to analog signals by conventional digital-to-analog converters 154 and 156, respectively, and these signals are fed into the servo systems 157 and 158 which although represented by a single box in the above systems are shown now as separate systems. The output from converter 154 is amplified by an amplifier 160 to develop a power output for driving the horizontal servo unit 162. Likewise the output of converter 156 is amplified by an amplifier 164 to develop a power output for driving the vertical servo unit 166. Servo units 162 and 166 are used to control the horizontal and vertical positioning of a dual-axis movable mirror such as shown in FIG. 3, or the direction of a star tracker as shown in FIG. 4, or the orientation of a spacecraft as shown in FIG. 6. Servo systems 157 and 158 may also include manual or remote command serving controls 170 and 172 which may be connected in circuit by switches 174 and 176, respectively. Control or position readouts 178 and 180 may also be provided.

Referring now to FIGS. 9 and 10 of the drawings, an alternative embodiment of a compound prism structure sensitive along a single axis is disclosed. The compound prism 200 includes a pentaprism 202 which is coated on the surfaces A and B with a highly reflective coating and which has its side C cemented to a beam splitter prism 204. The diagonal reflective surface D of prism 204 is likewise cemented to the diagonal face of another prism 206 having its vertical face E cemented to one side of the prism 208. The vertical face F of pentaprism 202 is cemented to one side of a second beam splitter prism 210 whose opposite side is cemented to prism 208 at G. The faces 212 and 214 of prism 208 are inclined at equal angles relative to the end face 216 so as to cause the optical output axis 218 to be parallel with the optical input axis 220. A suitable input lens system 222 provides an entrance pupil and defines the optical axis 220 and is cemented to end face 216 of prism 208.

To illustrate the operation of the prism, additional reference is made to FIG. 10 wherein it is seen that a light ray I entering the entrance pupil 224 along input axis 220 is split into two beams $I_1$ and $I_2$, with $I_1$ being reflected by surface 214 of beam splitter prism 210 and directed onto surface 212 where it is again reflected to coincide with the exit axis 218 and pass through the prisms 204 and 206 and out the exit pupil 226. The unreflected portion of the entering light is transmitted (ray $I_2$) through splitter prism 210 and into pentaprism 202 where it is reflected by face B onto face A and thence vertically downward to the reflecting surface D wherein the rays $I_1$ and $I_2$ are recombined for passage out of exit pupil 226. However, because rays $I_2$ experience three reflections while the rays $I_1$ experience only two reflections, the two light bundles will be 180° out of phase and thus will interfere so as to cancel light at exit pupil 226 if the optical path lengths $I_1$ and $I_2$ were made equal. The dimensions of prism 208 are chosen so as to equalize the optical path lengths of $I_1$ and $I_2$ through the command prism.

The incoming light striking entrance pupil 224 is collimated off of the sensitive axis 220 by an angle $a$, as indicated by the ray $I_\alpha$. These light rays, collimated by lens system 222 and upon striking surface 214, will be half reflected and half transmitted as indicated by the rays $I_{\alpha 1}$ and $I_{\alpha 2}$, respectively. In tracing rays $I_{\alpha 1}$ and $I_{\alpha 2}$ through the two optical paths of compound prism 200, it will be noted that by the time the two bundles of light rays are recombined at surface D, they are not only 180° out of phase but they are translated vertically by a distance determined by the angle $\alpha$. Accordingly, as indicated by the above set forth equation, the number of fringes generated at exit pupil 226 is directly proportional to the angle $\alpha$ and provides a direct indication of the angular deflection of input light from the input axis 220 of the device. However, note that the internal reflections are in the vertical plane which is the sensitive plane for a penta prism such as prism 202 and it is relatively insensitive to deviations out of this vertical plane.

The single axis interferometer of FIGS. 9 and 10 has sensitivity to rotation in only one axis. For certain applications this is desirable and any disturbance of the fringe pattern due to a second axis motion would be undesirable. As an example of one such application, the alignment of a platform so as to maintain a fixed inertial position about the roll axis is shown in FIG. 11.

Consider platform 230 as mounted in a three-axis gimbal system (not shown) complete with a servo system 231 operating in a null mode about an inertia fixed position in roll, pitch and yaw. For clarity, the gimbals, servomotors and amplifiers, etc., of the system are not shown. The sensor system for yaw and pitch axis control utilizes a dual-axis interferometer 232 of the type illustrated in FIGS. 1 and 2. Light from laser 233 is expanded to a collimated bundle of light by beam expander 234 and is reflected off of mirror 235 to sensor 232. Yaw or pitch axis rotation will create a fringe pattern at the output of sensor 232 which is read by fringe counter 236 which produces an error signal for driving the yaw and pitch controls of servo system 231. To sense roll axis rotation, light from laser 237 is expanded to a collimated bundle of light by beam expander 238 and is reflected off of mirror 239 to the single axis sensor 240 which is of the type illustrated in FIGS. 9 and 10. Roll axis rotation of platform 230 will create a fringe pattern at the output of sensor 240 which is counted by fringe counter 241 to produce an error signal. The error signal is fed into servo system 231 to drive the roll axis gimbal to null condition maintaining the initial inertial alignment in rotation. Small excursions of pitch and yaw rotation will not affect the roll fringe pattern.

Whereas, the present invention has been described with regard to several particular embodiments, it is to be understood that these embodiments are for purposes of illustration only and are in no way intended to be limiting. Accordingly, it is intended that the claims be interpreted as covering all modifications and applications thereof as fall within the true spirit and scope of the invention.

What is claimed is:

1. A compound prism interferometer comprising:
a first prism having a light planar face defining an entrance aperture for a light beam to enter said interferometer, a second planar face disposed parallel to said first planar face, a third planar face disposed opposite said first planar face and intersecting said second planar face at a first angle, a fourth planar face disposed opposite and parallel to said third planar face and intersecting said first planar face at said first angle;

a second prism, a right-angle prism, having a fifth planar face, a sixth face disposed normal to said fifth planar face, and a seventh planar face opposite and intersecting said fifth and sixth planar faces at angles of 45°, said second prism being disposed adjacent said first prism with said fifth planar face and said second planar face being in face-to-face engaging relationship;

a third prism, a right-angle prism, having an eighth planar face defining an exit aperture for said light beam, a ninth planar face disposed normal to said eighth planar face, and a tenth planar face opposite and intersecting said eighth and ninth planar faces at angles of 45°, said third prism being disposed adjacent said second prism with said tenth planar face and said seventh planar face being in face-to-face engaging relationship; and a fourth prism, a penta prism, having an eleventh planar face, a twelfth planar face intersecting said eleventh planar face at a second angle, a thirteenth planar face opposite said eleventh planar face and lying in a plane intersecting the plane of said twelfth planar face at a third angle, and a fourteenth planar face opposite said twelfth planar face, said twelfth and thirteenth planar faces being reflective for causing internal reflection of light within said fourth prism; said fourth prism being disposed adjacent first and third prisms with said fourteenth planar face being optically coupled to said third planar face and said eleventh planar face being in face-to-face engaging relationship with said ninth planar face whereby said light beam upon entering said first prism through said entrance aperture strikes said third planar face which divides it into a reflected beam and a transmitted beam, said reflected beams being reflected in the direction of said fourth planar face and being in turn reflected by said fourth planar face through said second planar face and said second and third prisms to said exit aperture, said transmitted beam passing through said third planar face into said fourth prism and being reflected by said twelfth planar face in the direction of said thirteenth planar face and thence being reflected by said thirteenth planar face through said eleventh planar face to said tenth planar face whereby it is reflected to said exit aperture, said reflected and transmitted beams being combined at said exit aperture to develop an interference fringe pattern.

2. An optical direction sensing system for determining the angular deflection between the input optical axis of said sensing system and the line of sight to a remote light source, comprising:

a compound-prism interferometer means responsive to light from said source for generating an interference fringe pattern having a number of fringes related to the angular deviation between said input optical axis and said line of sight; and a fringe counting means responsive to said fringe pattern for generating an output signal commensurate with the number of fringes in said fringe pattern;

said compound-prism interferometer means comprising;

a first prism having a first planar face defining an entrance aperture for a light beam to enter said interferometer, a second planar face disposed parallel to said first planar face, a third planar face disposed opposite said first planar face and intersecting said second planar face at the first angle, a fourth planar face disposed opposite and parallel to said third planar face and intersecting said first planar face at said first angle;

a second prism, a right-angle prism, having a fifth planar face, a sixth planar face disposed normal to said fifth planar face, and a seventh planar face opposite and intersecting said fifth and sixth planar faces at angles of 45°, said second prism being disposed adjacent said first prism with said fifth planar face and said second planar face being in face-to-face engaging relationship;

a third prism, a right-angle prism, having an eighth planar face defining an exit aperture for said light beam, a ninth planar face disposed normal to said eighth planar face, and a tenth planar face opposite and intersecting said eighth and ninth planar faces at angles of 45°, said third prism being disposed adjacent said second prism with said tenth planar face and said seventh planar face being in face-to-face engaging relationship; and a fourth prism, a penta prism, having an eleventh planar face, a twelfth planar face intersecting said eleventh planar face at a second angle, a thirteenth planar face opposite said eleventh planar face and lying in a plane intersecting the plane of said twelfth planar face at a third angle, and a fourteenth planar face opposite said twelfth planar face, said twelfth and thirteenth planar faces being reflective for causing internal reflection of light within said fourth prism, said fourth prism being disposed adjacent first and third prisms with said fourteenth planar face being optically coupled to said third planar face and said eleventh planar face being in face-to-face engaging relationship with said ninth planar face whereby said light beam upon entering said first prism through said entrance aperture strikes said third planar face which divides it into a reflected beam and a transmitted beam, said reflected beam being reflected in the direction of said fourth planar face through said second planar face and said second and third prisms to said exit aperture, said transmitted beam passing through said third planar face into said fourth prism and being reflected by said twelfth planar face in the direction of said thirteenth planar face and thence being reflected by said thirteenth planar face through said eleventh planar face to said tenth planar face whereby it is reflected to said exit aperture, said reflected and transmitted beams being combined at said exit aperture to develop an interference fringe pattern.

3. An optical direction sensing system as recited in claim 2 and further comprising a servo system responsive to said output signal and operative to maintain said line of sight substantially coincident with said input optical axis.

4. A compound prism interferometer comprising:

a first prism having a first planar face defining an entrance aperture for a light beam to enter said interferometer, a second planar face disposed parallel to said first planar face, a third face disposed opposite said first planar face and intersecting said second planar face at a first angle, a fourth planar face disposed opposite and parallel to said third planar face and intersecting said first planar face at said first angle;

a second prism, a right-angle prism, having a fifth planar face, a sixth planar face disposed normal to said fifth planar face, and a seventh planar face opposite and intersecting said fifth and sixth planar faces at angles of 45°, said second prism being disposed adjacent said first prism with said fifth planar face and said second planar face being in face-to-face engaging relationship;

a third prism, a right-angle prism, having an eighth planar face defining an exit aperture for said light beam, a ninth planar face disposed normal to said eighth planar face, and a tenth planar face opposite and intersecting said eighth and ninth planar faces at angles of 45°, said third prism being disposed adjacent said second prism with said tenth planar face and said seventh planar being in face-to-face engaging relationship; and a fourth prism, a penta prism, having an eleventh planar face, a twelfth planar face intersecting said eleventh planar face at a second angle, a thirteenth planar face opposite said eleventh planar face and lying in a plane intersecting the plane of said twelfth planar face at a third angle, and a fourteenth planar face opposite said twelfth planar face, said twelfth and thirteenth planar being reflective for causing internal reflection of light within said fourth prism, said fourth prism being disposed adjacent first and third prisms with said fourteenth planar face being optically coupled to said third planar face and said eleventh planar face being in face-to-face engaging relationship with said ninth planar face;

a fifth prism, a right-angle prism, having a fifteenth planar face, a sixteenth planar face disposed normal to said fifteenth planar face, and a seventeenth planar face which intersects the planes of said fifteenth and sixteenth faces, said sixteenth planar face being larger than said fifteenth planar face;

said fifth prism being disposed adjacent said first prism and said fourth prism, said third planar face being in face-to-face engaging relationship with said seventeenth planar face, and said fourteenth planar face being in face-to-face engaging relationship with said sixteenth planar face;

said fourth prism being disposed adjacent said third prism with said eleventh planar face being in face-to-face engaging relationship with said eleventh planar face whereby said light beam upon entering said first prism through said entrance aperture strikes said third planar face which divides it into a reflected beam and a transmitted beam, said reflected beam being reflected in the direction of said fourth planar face and being in turn reflected by said fourth planar face through said second planar face and said second and third prisms to said exit aperture, said transmitted beam passing through said third planar face into said fourth prism and being reflected by said twelfth planar face in the direction of said thirteenth planar face and thence being reflected by said thirteenth planar face through said eleventh planar face to said tenth planar face whereby it is reflected to said exit aperture, said reflected and transmitted beams being combined at said exit aperture to develop an interference fringe pattern.

* * * * *